United States Patent [19]

Thioux et al.

[11] Patent Number: 4,756,232
[45] Date of Patent: Jul. 12, 1988

[54] VACUUM SERVOMOTOR FOR ASSISTANCE WITH BRAKING

[75] Inventors: Alain Thioux, Chennevieres; Jean-Jacques Carre, Le Raincy, both of France

[73] Assignee: Societe Anonyme D.B.A., Paris, France

[21] Appl. No.: 915,931

[22] Filed: Oct. 6, 1986

Related U.S. Application Data

[63] Continuation of Ser. No. 713,228, Mar. 18, 1985.

[30] Foreign Application Priority Data

Mar. 21, 1984 [FR] France .................. 84 04388

[51] Int. Cl.⁴ .............................. F15B 9/10
[52] U.S. Cl. .................. 91/376 R; 91/369 A
[58] Field of Search .............. 60/547.1; 91/369 A, 91/376 R, 369 C; 251/77

[56] References Cited

U.S. PATENT DOCUMENTS

| | | | |
|---|---|---|---|
| 3,110,031 | 11/1963 | Price | 91/369 A |
| 3,183,789 | 5/1965 | Stelzer | 91/376 R |
| 3,874,406 | 4/1975 | Von Loewis | 251/77 |
| 3,937,126 | 2/1976 | Grabb | 251/77 |
| 4,227,371 | 10/1980 | Takeuchi | 60/547 R |
| 4,296,770 | 10/1981 | Rice | 251/77 |
| 4,358,990 | 11/1982 | Takeuchi | 91/369 A |
| 4,508,009 | 4/1985 | Shimamura | 91/369 A |
| 4,522,031 | 6/1985 | Kytta | 60/547.1 |
| 4,546,691 | 10/1985 | Kobayashi | 91/369 A |
| 4,562,696 | 1/1986 | Furuta | 60/554 |
| 4,590,845 | 5/1986 | Tateoka | 91/369 A |
| 4,643,076 | 2/1987 | Satoh | 91/376 R |

FOREIGN PATENT DOCUMENTS 0158552 10/1985 European Pat. Off. .
2046382 11/1980 United Kingdom .
2084274 4/1982 United Kingdom .

*Primary Examiner*—Abraham Hershkovitz
*Attorney, Agent, or Firm*—Larry J. Palguta; Ken C. Decker

[57] ABSTRACT

The return spring (33) of the actuating rod bears upon a collar (30) which is mounted so as to slide on the rod (21) and which incorporates, on the opposite side from the return spring (33), first (34) and second (35) bearing surfaces intended to cooperate, respectively, with an abutment (39) formed on the rod and a fixed abutment (43) advantageously formed by the end, which is folded back, of a tubular abutment component (40) which is firmly fixed to the casing (1).

23 Claims, 1 Drawing Sheet

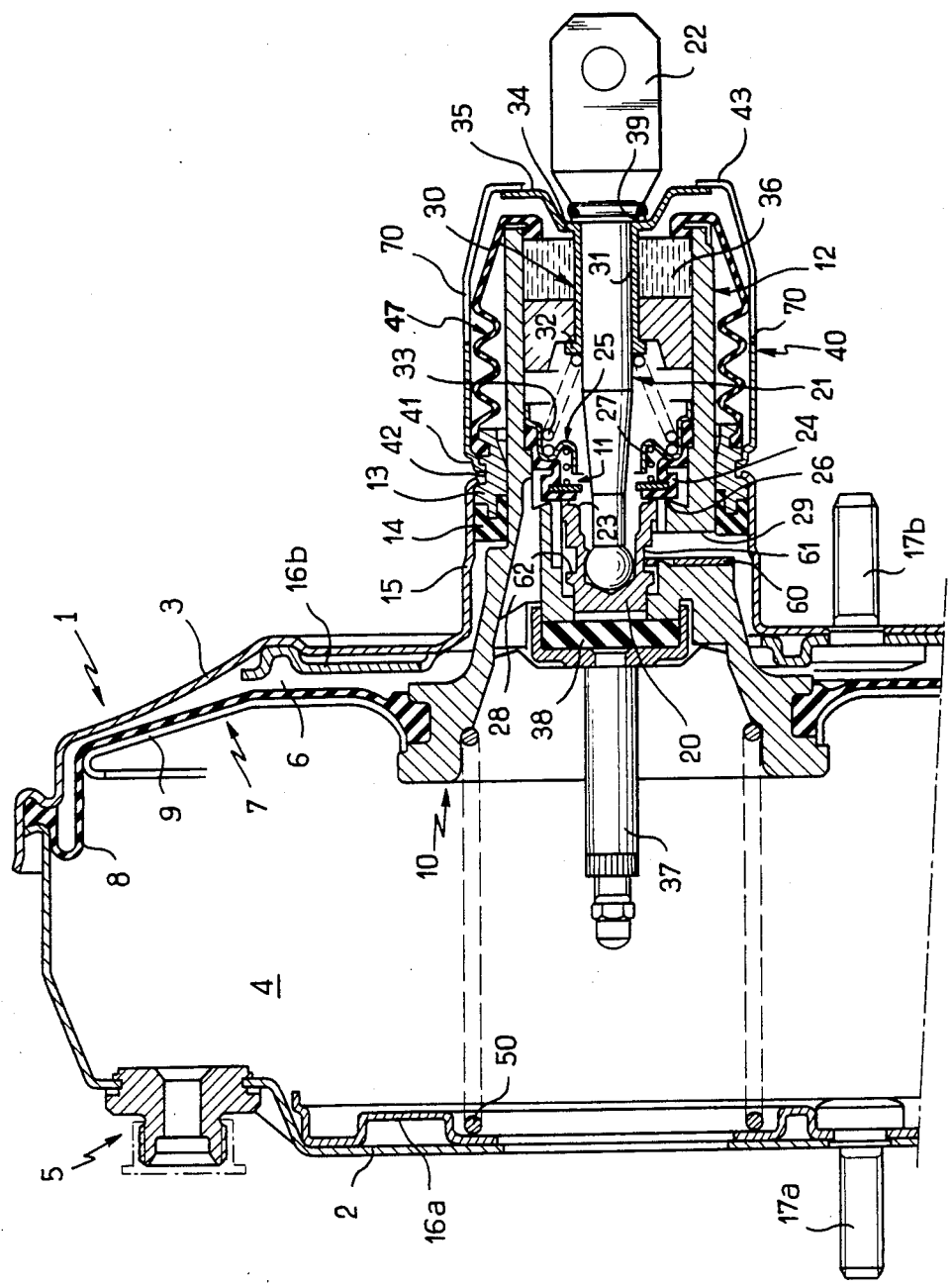

VACUUM SERVOMOTOR FOR ASSISTANCE WITH BRAKING

This is a continuation of abandoned application Ser. No. 713,228 filed Mar. 18, 1985, now abandoned.

The present invention concerns vacuum servomotors for assistance with braking, more particularly for motor vehicles, of the type incorporating a casing consisting of a front shell and a rear shell and divided internally into a vacuum chamber and a working chamber by a piston structure pushed by a spring towards the rear shell and incorporating a hub enclosing a distribution valve means incorporating a fixed valve seat formed by the hub, a movable valve seat, coaxial with the fixed valve seat and formed by the end of a plunger sliding in the hub and joined to a servomotor actuating rod, and a valve means mounted in the hub and pushed elastically towards the fixed valve seat and the movable valve seat so as to cooperate with the latter, and a rod return spring, coaxial with the rod and situated between the hub and a collar mounted on the rod.

A servomotor of this type is described in the document FR-A-1,549,121. In the servomotor described in the document, the rest position of the piston structure is determined by the latter coming into abutment against the rear shell, the rest position of the valve plunger being determined by a key mounted radially in the hub of the piston structure. As a result, the actuating dead travel of the servomotor (that is to say the clearance existing, in the rest configuration, between the valve means and the fixed valve seat) cannot be reduced to a very small value, taking into account the chain of manufacturing dimensions and tolerances and the need to ensure, during the phase when braking is released, an opening between the valve means and the fixed valve seat in order to permit proper depressurization of the rear chamber.

In the document U.S. Pat. No. 4,358,990, the rest position of the piston structure is also determined by it coming into abutment against the rear shell, the rest position of the valve plunger actually being determined by an abutment which is provided on the actuating rod and which cooperates with a rear extension of the rear shell. As a result, in order to permit the dead travel of the servomotor to be adjusted, it is necessary to provide means for adjusting the abutment on the rod which considerably increase the costs of mass production and assembly.

The aim of the present invention is to propose a servomotor of the type mentioned above, of simplified construction, of lower manufacturing and assembly costs, and having zero dead travel, in which the piston structure and the valve plunger automatically adopt relative rest positions which are self-adapting to provide this zero dead travel.

To achieve this, according to a characteristic of the invention, the collar on which the rod return spring bears is mounted so as to slide on the actuating rod and incorporates, on the opposite side from the rod return spring, first and second bearing surfaces intended to cooperate with an abutment formed on the rod, and a fixed abutment, respectively.

According to a more particular characteristic of the invention, the fixed abutment is advantageously formed by an abutment component firmly fixed to the casing, the abutment component being typically tubular and extending concentrically around the rear portion of the hub of the piston structure, the fixed abutment cooperating with the second bearing surface of the collar, which is mounted so as to slide on the rod, being formed by an end of the abutment component which is folded back towards the rod.

With such an arrangement, the relative rest positions of the piston structure and of the valve plunger are obtained automatically by the fixed and movable valve seats bearing against the valve means under the effect of the slight vacuum differential which exists, in the operating condition of the servomotor, in the two chambers of the casing when the latter is connected to a source of vacuum, and of the rod return spring bearing, through the intermediary of the sliding collar, against the fixed abutment with which neither the piston structure nor the actuating rod interfere in abutment, the elasticity of the rod return spring thus allowing a range of self-adaptation eliminating any special adjustment means which would increase the costs of manufacture and assembly.

Other characteristics and advantages of the present invention will emerge from the following description of an embodiment, given by way of illustration but not limiting in any way, with reference to the accompanying drawing, in which:

The single FIGURE is a view in partial longitudinal section of a servomotor for assistance with braking according to the invention.

The servomotor for assistance with braking according to the invention typically incorporates a casing, designated generally by the reference 1, consisting of the sealed peripheral assembly of a front casing shell 2, and a rear casing shell 3. The casing 1 is divided internally into a front chamber or vacuum chamber 4, intended to be joined, by a connector 5 mounted in the front shell 2, to a source of vacuum, for example the inlet manifold of the engine of a motor vehicle, and a rear chamber or working chamber 6, by a piston structure, designated generally by the reference 7, consisting in a conventional manner of an annular assembly of a diaphragm 8 and a reinforcement plate 9, mounted on a hub 10 enclosing a distribution valve means 11, as is described more fully below. In the embodiment shown, the hub 10 incorporates a rear portion of reduced diameter 12 of tubular configuration which is guided so as to slide and to be sealed relative to the rear shell 3 of the casing 1 by an annular guiding and sealing assembly, consisting of a guide 13 and a sliding seal 14, mounted in a rear tubular extension or neck 15 of the rear shell 3. The casing 1 incorporates a front annular reinforcement 16a and a rear annular reinforcement 16b which are fixed, respectively, to the front surfaces of the front shell 2 and of the rear shell 3 and which carry the fixing screws 17a and 17b which serve, respectively, for mounting a master cylinder (not shown) on the front shell 2, and for mounting the master cylinder/servomotor unit on a fixed bulkhead of a vehicle (not shown).

A valve plunger 20 is mounted so as to slide in a central housing of the central portion of the hub 10 of the piston structure 7, the valve plunger 20 being firmly fixed to a ball jointed end of an actuating rod 21 incorporating, at its other end, a fork 22 intended for articulated connection to a brake pedal of the motor vehicle (not shown). The plunger 20 forms at its rear end a movable annular valve saet 23 intended to cooperate with the front reinforced surface of a tubular valve means 24 made of elastomeric material and mounted against an internal shoulder of the rear portion of the hub 12 by a tubular support plate 25 having a cross-section which is essentially Z-shaped or L-shaped. The central portion of the hub 10 also defines a fixed annular valve seat 26 which is situated concentrically around the plunger 20 and is also intended to cooperate selectively with the front surface of the valve means 24. This front surface of the valve means 24 is pushed in the direction towards the fixed valve seat 26 and the movable valve seat 23 by a valve spring 27 bearing against the inner end of the tubular support plate 25. Longitudinal passages 28 and a radial passage 29 are formed in the hub 10 in order to put the valve means 11 in communication with the vacuum chamber 4 and the working chamber 6, respectively.

In accordance with the invention, a collar, designated generally by the reference 30, is mounted so as to slide on the actuating rod 21, the collar 30 incorporating a tubular stem 31 engaged on a cylindrical portion of the rod 21, and incorporating a front end flange 32 forming a bearing surface for a rod return spring 33 which is helical and in the shape of a frustum of a cone and which bears, at its other end, against the middle portion of the tubular support plate 25. At its opposite end from the flange 32, the collar 30 incorporates a second flange portion extending radially outwards 34 extended axially outwards by a portion which is in the shape of a frustum of a cone itself terminating in an annular end flange extending radially outwards 35 which is offset axially from the inner flange 34. Situated in the rear hub portion 12, around the rod 21 (in this case, around the collar 30), is an annular filter assembly 36 which removes impurities from the atmospheric air which enters through the inside of the rear hub portion 12, into the valve means 11 and from there, selectively, during a braking phase, into the rear working chamber 6 of the servomotor.

According to a feature of the invention, a tubular abutment component 40, firmly fixed to the casing 1, is positioned around the rear hub portion 12 extending out from the rear shell 3 in order to cooperate, by bearing against it, with the rear surface of the end flange 35 of the collar 30. In the embodiment shown, the tubular abutment component 40 is crimped, at its front end 41, into a peripheral groove 42 of the guide 13 and incorporates, at its opposite end (that is to say the rear end), an annular flange folded radially inwards 43 forming an abutment surface for the end flange 35 of the collar 30. As shown in the drawing, a protective bellows 47 is situated in the annular space between the tubular abutment component 40 and the rear hub portion 12, the bellows 47 having its front end engaged on the guide 13 and its rear end engaged inside the rear end of the rear hub portion 12. The servomotor is completed by an output rod 37 mounted on the central hub portion 10 and intended to cooperate with the primary piston of the master cylinder mentioned above, an annular reaction component made of elastomeric material 38 being interposed between the output rod 37 and the valve plunger 20. The actuating rod 21 also incorporates, advantageously in the region of its connection to the fork 22, a rim extending outwards 39 which is intended to cooperate with the end flange 34 of the collar 30 and to displace the latter at the same time as the rod 21 during a braking operation so as to accompany the movement of the piston structure 7 against its return spring 50 situated between the front reinforcement 16a and the hub 10.

In manufacture, the component parts of the servomotor are dimensioned in such a way that the latter essentially occupy the position shown in the single FIGURE, that is to say, under the effect of the piston return spring 50, with the piston structure 7 at a slight distance from the rear shell 3 with the collar 30 in abutment by its end flange 35 against the flange 43 of the abutment component 40 and its inside flange 34 in contact with the rim 39 of the rod 21, the fixed valve seat 26 and the movable valve seat 23 being, under these conditions, coplanar, both bearing so as to be sealed against the front surface of the valve means 24. When the servomotor is installed and connected to a source of vacuum, the depression created in the vacuum chamber 4 at first tends to displace slightly the piston structure 7 towards the front and thus to disengage the fixed valve seat 26 from the front surface of the valve means 24 (the movable valve seat 23 remaining pressed against the front surface of the valve means 24 under the effect of the return spring 33 and of the thrust between the inner flange 34 and the rim 39 of the rod 21). Consequently, the clearance thus created between the fixed valve seat 26 and the valve means 24 establishes a communication, through the passage 29, between the vacuum chamber 4 and the working chamber 26, bringing the latter to a vacuum level which is close to, but limited to be less than, that existing in the vacuum chamber 4, thus allowing the piston return spring 50 to bring back the piston structure 7 essentially to the position previously occupied, that is to say with the fixed valve seat 26 once again bearing against the valve means 24. It will be seen that, owing to the floating mounting of the rod 21 (and of the plunger 20) relative to the collar 30, the latter is not in fact subject to the installation positioning of the rod 21 and that the piston structure 7 can regain the rest configuration with zero travel according to the procedure mentioned above, largely independent of the respective tolerances of the hub 10 and of the casing 1.

The operation during the braking phase is conventional: when the rod 21 is displaced to the left (in the drawing) away from the rest position (in which the two chambers 4 and 6 are essentially at the same level of vacuum), the movable valve seat 23 separates from the front surface of the valve means 24, which remains pressed against the fixed valve seat 26, thus allowing atmospheric air passing through the filter assembly 36 to enter into the working chamber 6 through the passage 29 thus creating, on each side of the piston structure 7, an assistance pressure differential displacing this piston structure 7 in the direction of actuation of the rod 21. When the actuating force on the rod 21 ceases, the latter is brought back towards the rear under the effect of the return spring 33 (and of the return spring of the pedal). Consequently, the movable valve seat 23 presses the valve means 24 strongly towards the rear against its valve spring 25, thus opening wide the valve means 24 from the fixed valve seat 26 and allowing rapid depressurization of the working chamber 6 so that, under the effect of the piston return spring 50, the piston structure 7 comes back equally rapidly towards its rest position in the region of the rear shell 3. At the end of this return movement, the collar 30 comes to bear once again, by its end flange 35, against the abutment flange 43 of the abutment component 40, so as to reposition, through the intermediary of the return spring 33, the piston structure 7 into its rest configuration with the fixed valve seat 26 bearing against the front surface of the valve means 24 in a plane determined by the movable valve seat 23 in the rest position of the plunger 20.

In accordance with a feature of the invention, to enable the servomotor to conform to tests known as pulling tests, consisting of exerting a large tensile force on the rod 21 (towards the right, in the drawing), a U-shaped key 60 is provided which is firmly engaged in the front end of the passage 29 according to an arrangement forming the subject of the document EP-A-0,101,658, the end of the key 60 which is cut away in the shape of a U entering, with a clearance, into a peripheral groove 61 of the plunger 20 which is limited towards the front by an annular shoulder 62. With such an arrangement, when the large tensile force mentioned above is exerted on the rod 21, the plunger 20 comes to bear by its annular shoulder 62 against the key 60, the tensile force thus being transmitted by the latter to the piston structure 7 so as to bring the latter to bear against the rear reinforcement 16b. It will be noted that, as shown in the drawing, in order to allow the plunger 20 to achieve, during a phase of braking release, the large opening between the valve means 24 and the fixed valve seat 26, the groove 61 is axially dimensioned in such a way that in the rest configuration shown in the drawing, a large clearance is arranged between the key 60 and the shoulder 62.

According to another feature of the invention, for cases in which, in the rest configuration, installed in the motor vehicle, the pedal joined to the fork 22 is in the region adjacent to the rear end of the rear hub portion 12, a diametral slot 70 is provided in the rear portion of the tubular abutment component 40, which extends axially and into which the web or the edge of the pedal is capable of entering when the latter is fully depressed.

We claim:

1. A braking assistance vacuum servomotor comprising a stationary casing having a front shell and a rear shell and divided internally into a vacuum chamber and a working chamber by a movable piston structure biased by a spring toward the rear shell and including a central hub portion enclosing distribution valve means comprising a first valve seat formed by the hub portion, a second valve seat coaxial with the first valve seat and formed by one end of a plunger slideable in the hub portion and connected to an actuating rod of the servomotor, and a valve member mounted in the hub portion and resiliently biased toward the first and second valve seats so as to cooperate with the second valve seat, and a rod return spring operatively arranged coaxially around the rod between the hub portion and a bearing member slideably supported on an intermediate shank portion of the rod, the bearing member having, on a side opposite the return spring, laterally spaced first and second bearing surfaces cooperating respectively in axial bearing engagement with a first abutment movable with the rod and a second abutment having at least one fixed reference position, the second abutment formed by an end portion of a stop member supported by the casing, the end portion extending transversely toward the rod, the hub portion having a rear part which is slideably and sealingly guided in a central tubular rear extension of the rear shell, the stop member being at least part tubular and extending concentrically around the rear part of the hub portion, and the bearing member including a sleeve portion engaged on the rod and having a first end zone cooperating in bearing engagement with the return spring and a second end zone forming the first bearing surface and extending transversely outwardly to form the second bearing surface.

2. The servomotor according to claim 1, wherein the stop member is fixedly connected to the rear tubular extension of the rear shell of the casing.

3. The servomotor according to claim 2, wherein a rear part of the hub portion is guided so as to slide by an annular guiding and sealing assembly mounted in the rear tubular extension of the rear shell, the stop member being mounted upon the annular guiding and sealing assembly.

4. The servomotor according to claim 3, further comprising a sealing bellows joined to the rear part of the hub portion and extending between the hub portion and stop member.

5. The servomotor according to claim 4, wherein the stop member is formed with a diametral slot extending from the end portion forming the second abutment toward the tubular rear extension of the rear shell.

6. The servomotor according to claim 1, wherein said first and second bearing surfaces are axially spaced apart one from the other.

7. The servomotor according to claim 1, further comprising a retaining key having one inner end received within a peripheral groove of the plunger and extending in a radial opening in the hub portion establishing a fluid communication between the valve means and the working chamber.

8. A braking assistance vacuum servomotor comprising a stationary casing having a front shell and a rear shell and divided internally into a vacuum chamber and a working chamber by a movable piston structure biased by a spring toward the rear shell and including a central hub portion enclosing distribution valve means comprising a first valve seat formed by the hub portion, a second valve seat coaxial with the first valve seat and formed by one end of a plunger slidable in the hub portion and connected to an actuating rod of the servomotor, and a valve member mounted in the hub portion and resiliently biased toward the first and second valve seats so as to cooperate with the second valve seat, and a single spring operatively arranged coaxially around the rod between the hub portion and a bearing member slidably supported on an intermediate cylindrical shank portion of the rod, the bearing member having, on a side opposite the spring, laterally spaced first and second bearing surfaces adapted for selective cooperation in axial bearing engagement with, respectively, a first abutment movable with the rod when the servomotor is operated and a laterally offset separate second abutment having at least one predetermined fixed reference position when the servomotor is not operated, the second abutment formed by a stop member supported by the casing, the second abutment further formed by an end portion of the stop member extending transversely toward the rod, and the hub portion having a rear part which is slidably and sealingly guided in a central tubular rear extension of the rear shell, the stop member being at least part tubular and extending concentrically around the rear part of the hub portion.

9. The servomotor according to claim 8, wherein the bearing member includes a sleeve portion engaged on the rod and having a first end zone cooperating in bearing engagement with the spring and a second end zone forming the first bearing surface and extending transversely outwardly to form the second bearing surface.

10. The servomotor according to claim 8, wherein the stop member is fixedly connected to a rear tubular extension of the rear shell of the casing.

11. The servomotor according to claim 10, wherein a rear part of the hub portion is guided so as to slide by an annular guiding and sealing assembly mounted in the rear tubular extension of the rear shell, the stop member being mounted upon the annular guiding and sealing assembly.

12. The servomotor according to claim 11, further comprising a sealing bellows joined to the rear part of the hub portion and extending between the hub portion and stop member.

13. The servomotor according to claim 8, wherein said first and second bearing surfaces are axially spaced apart one from the other.

14. The servomotor according to claim 8, further comprising a retaining key having one inner end received within a peripheral groove of the plunger and extending in a radial opening in the hub portion establishing a fluid communication between the valve means and the working chamber.

15. A braking assistance vacuum servomotor comprising a stationary casing having a front shell and a rear shell and divided internally into a vacuum chamber and a working chamber by a movable piston structure biased by a spring toward the rear shell and including a central hub portion enclosing distribution valve means comprising a first valve seat formed by the hub portion, a second valve seat coaxial with the first valve seat and formed by one end of a plunger slidable in the hub portion and connected to an actuating rod of the servomotor, and a valve member mounted in the hub portion and resiliently biased toward the first and second valve seats so as to cooperate with the second valve seat, and a single spring operatively arranged coaxially around the rod between the hub portion and a bearing member slidably supported on an intermediate cylindrical shank portion of the rod, the bearing member having, on a side opposite the spring, laterally spaced first and second bearing surfaces adapted for selective cooperation in axial bearing engagement with, respectively, a first abutment movable with the rod when the servomotor is operated and a laterally offset separate second abutment having at least one predetermined fixed reference position when the servomotor is not operated, the second abutment formed by a stop member supported by the casing, the stop member fixedly connected to a rear tubular extension of the rear shell of the casing, a rear part of the hub portion guided so as to slide by an annular guiding and sealing assembly mounted in the rear tubular extension of the rear shell, the stop member being mounted upon the annular guiding and sealing assembly, a sealing bellows joined to the rear part of the hub portion and extending between the hub portion and stop member, and the stop member formed with a diametral slot extending from a rear stop member portion forming the second abutment and toward the tubular rear extension of the rear shell.

16. A braking assistance vacuum servomotor comprising a stationary casing having a front shell and a rear shell and divided internally into a vacuum chamber and a working chamber by a movable piston structure biased by a spring toward the rear shell and including a central hub portion enclosing distribution valve means comprising a first valve seat formed by the hub portion, a second valve seat coaxial with the first valve seat and formed by one end of a plunger slidable in the hub portion and connected to an actuating rod of the servomotor, and a valve member mounted in the hub portion and resiliently biased toward the first and second valve seats so as to cooperate with the second valve seat, and a rod return spring operatively arranged coaxially around the rod between the hub portion and a bearing member slidably supported on an intermediate shank portion of the rod, the bearing member having, on a side opposite the return spring, laterally spaced first and second bearing surfaces cooperating respectively in axial bearing engagement with a first abutment movable with the rod and a second abutment having at least one fixed reference position, the bearing member including a sleeve portion engaged on the rod and having a first end zone cooperating in bearing engagement with the return spring and a second end zone forming the first bearing surface and extending transversely outwardly to form the second bearing surface, the second abutment formed by a stop member supported by the casing, the second abutment further formed by an end portion of the stop member extending transversely toward the rod, and the hub portion having a rear part which is slidably and sealingly guided in a central tubular rear extension of the rear shell, the stop member being at least part tubular and extending concentrically around the rear part of the hub portion.

17. The servomotor according to claim 16, wherein the stop member is fixedly connected to a rear tubular extension of the rear shell of the casing.

18. The servomotor according to claim 17, wherein a rear part of the hub portion is guided so as to slide by an annular guiding and sealing assembly mounted in the rear tubular extension of the rear shell, the stop member being mounted upon the annular guiding and sealing assembly.

19. The servomotor according to claim 18, further comprising a sealing bellows joined to the rear part of the hub portion and extending between the hub portion and stop member.

20. The servomotor according to claim 16, wherein said first and second bearing surfaces are axially spaced apart one from the other.

21. The servomotor according to claim 16, further comprising a retaining key having one inner end received within a peripheral groove of the plunger and extending in a radial opening in the hub portion establishing a fluid communication between the valve means and the working chamber.

22. A braking assistance vacuum servomotor comprising a stationary casing having a front shell and a rear shell and divided internally into a vacuum chamber and a working chamber by a movable piston structure biased by a spring toward the rear shell and including a central hub portion enclosing distribution valve means comprising a first valve seat formed by the hub portion, a second valve seat coaxial with the first valve seat and formed by one end of a plunger slidable in the hub portion and connected to an actuating rod of the servomotor, and a valve member mounted in the hub portion and resiliently biased toward the first and second valve seats so as to cooperate with the second valve seat, and a rod return spring operatively arranged coaxially around the rod between the hub portion and a bearing member slidably supported on an intermediate shank portion of the rod, the bearing member having, on a side opposite the return spring, laterally spaced first and second bearing surfaces cooperating respectively in axial bearing engagement with a first abutment movable with the rod and a second abutment having at least one fixed reference position, the bearing member including a sleeve portion engaged on the rod and having a first end zone cooperating in bearing engagement with the return spring and a second end zone forming the first bearing surface and extending transversely outwardly to form the second bearing surface, the second abutment formed by a stop member supported by the casing, the stop member fixedly connected to a rear tubular extension of the rear shell of the casing, a rear part of the hub portion guided so as to slide by an annular guiding and sealing assembly mounted in the rear tubular extension of the rear shell, the stop member being mounted upon the annular guiding and sealing assembly, a sealing bellows joined to the rear part of the hub portion and extending between the hub portion and stop member, and the stop member formed with a diametral slot extending from a rear stop member portion forming the second abutment and toward the tubular rear extension of the rear shell.

23. A braking assistance vacuum servomotor comprising a stationary casing having a front shell and a rear shell and divided internally into a vacuum chamber and a working chamber by a movable piston structure biased by a spring toward the rear shell and including a central hub portion enclosing distribution valve means comprising a first valve seat formed by the hub portion, a second valve seat coaxial with the first valve seat and formed by one end of a plunger slidable in the hub portion and connected to an actuating rod of the servomotor, and a valve member mounted in the hub portion and resiliently biased toward the first and second valve seats so as to cooperate with the second valve seat, and a rod return spring operatively arranged coaxially around the rod between the hub portion and a bearing member slidably supported on an intermediate shank portion of the rod, the bearing member having, on a side opposite the return spring, laterally spaced first and second bearing surfaces cooperating respectively in axial bearing engagement with a first abutment movable with the rod and a second abutment having at least one fixed reference position, the bearing member comprising a slidable sleeve extending between the return spring and second abutment so that when the servomotor is in a rest position the piston structure and actuating rod are positioned for movement relative to the sleeve while the sleeve engages the second abutment with fixed reference position, the bearing member including a sleeve portion engaged on the rod and having a first end zone cooperating in bearing engagement with the return spring and a second end zone forming the first bearing surface and extending transversely outwardly to form the second bearing surface, the second abutment formed by a stop member supported by the casing, the stop member fixedly connected to a rear tubular extension of the rear shell of the casing, a rear part of the hub portion guided so as to slide by an annular guiding and sealing assembly mounted in the rear tubular extension of the rear shell, the stop member being mounted upon the annular guiding and sealing assembly, a sealing bellows joined to the rear part of the hub portion and extending between the hub portion and stop member, and the stop member formed with a diametral slot extending from a rear stop member portion forming the second abutment toward the tubular rear extension of the rear shell.

* * * * *